US009845820B2

(12) United States Patent
Dent et al.

(10) Patent No.: US 9,845,820 B2
(45) Date of Patent: Dec. 19, 2017

(54) THIN WALLED FASTENER

(71) Applicant: Inspect 100 Ltd., Canton, OH (US)

(72) Inventors: William Dennis Dent, Canton, OH (US); Jeffrey Junior Parker, Canton, OH (US)

(73) Assignee: Inspect 100 Ltd., Canton, OH (US)

( * ) Notice: Subject to any disclaimer, the term of this patent is extended or adjusted under 35 U.S.C. 154(b) by 169 days.

(21) Appl. No.: 14/465,290

(22) Filed: Aug. 21, 2014

(65) Prior Publication Data

US 2016/0053800 A1 Feb. 25, 2016

(51) Int. Cl.
*F16B 37/00* (2006.01)

(52) U.S. Cl.
CPC .................... *F16B 37/00* (2013.01)

(58) Field of Classification Search
CPC ...................................... F16B 37/00
USPC ............................................ 411/427
See application file for complete search history.

(56) References Cited

U.S. PATENT DOCUMENTS

| | | | | | |
|---|---|---|---|---|---|
| 1,062,015 | A | * | 5/1913 | Lane | F16L 5/10 285/139.1 |
| 3,078,899 | A | * | 2/1963 | Kuffel | F16B 39/282 411/185 |
| 3,216,302 | A | * | 11/1965 | Kluth | F16B 23/003 411/427 |
| 3,550,498 | A | * | 12/1970 | Briles | F16B 33/004 411/432 |
| 4,290,469 | A | * | 9/1981 | Nakae | F16B 39/282 411/185 |
| 4,305,557 | A | * | 12/1981 | Kowalski | E21F 17/02 248/327 |
| 4,790,703 | A | * | 12/1988 | Wing | F16B 39/284 411/260 |
| 4,856,954 | A | * | 8/1989 | Peterson | B05D 1/322 134/1 |
| 5,772,377 | A | * | 6/1998 | Bydalek | F16B 37/14 411/375 |
| 6,039,524 | A | * | 3/2000 | McKinlay | F16B 39/282 411/136 |
| 6,244,807 | B1 | | 6/2001 | Garcia | |
| 2003/0133771 | A1 | * | 7/2003 | Dohm | F16B 37/044 411/533 |

(Continued)

FOREIGN PATENT DOCUMENTS

JP 2011195918 10/2011

OTHER PUBLICATIONS

"Aerospace Products", Alcoa Fastening Systems (Aerospace Products) Jun. 2014 (Jun. 2014), entire document, especially p. 14.

(Continued)

*Primary Examiner* — Gary Estremsky
(74) *Attorney, Agent, or Firm* — Hudak, Shunk & Farine Co. LPA

(57) ABSTRACT

A thin walled fastener nut of the present invention includes a tapered bell flange extending from one end towards the other. The tapered bell flange provides structural support to the nut when used in aerospace application. The thin walled fastener nut with the tapered bell flange meets the dimensional requirements of the National Aerospace Standard Specification MS21042 (NASM21042) and National Aerospace Standard Specification MS1291 (NAS1291).

24 Claims, 4 Drawing Sheets

(56) References Cited

U.S. PATENT DOCUMENTS

2010/0047037 A1\* 2/2010 Ishida .................... F16B 37/00
411/427
2015/0147134 A1\* 5/2015 Busby .................... F16B 39/30
411/263

OTHER PUBLICATIONS

"MS21042-02" by Aircraft Fasteners International (MS21042-02) downloaded from web, URL http://www.aircraftfast.com/MS21042-2.html, accessed via archive.org as of Jul. 20, 2013 (Jul. 20, 2013) entire document.

European Aviation Safety Agency, EASA Safety Information Bulletin, Aug. 7, 2012, 4 pages, SIB No. 2012-06R1.

Aerospace Industries Association of America, Inc., National Aerospace Standards Committee, NUT, Self-Locking, Aircraft, Reliability and Maintainability Usage Requirements for NASM33588, 2010, 2 pages.

Aerospace Industries Association of America, Inc., National Aerospace Standards Committee, NUT, Self-Locking, 450° F, Reduced Hexagon, Reduced Height, Ring Base, Non-Corrosion Resistant Steel, NASM21042, 1998, 2 pages.

SAE International, Aerospace Material Specification, Plating, Cadmium (Electrodeposited), AMS-QQ-P-416 Rev. C, Issued Jul. 2000 Revised Sep. 2009, 17 pages.

Coast Fabrication, Inc., MS21042 / NAS1291 Series Specifications, Nuts, Self-locking, 450°, Reduced Hexagon, Reduced Height, Ring Base, Non-Corrosion Resistant Steel, 1 page, Document is undated but was printed on Aug. 19, 2014.

\* cited by examiner

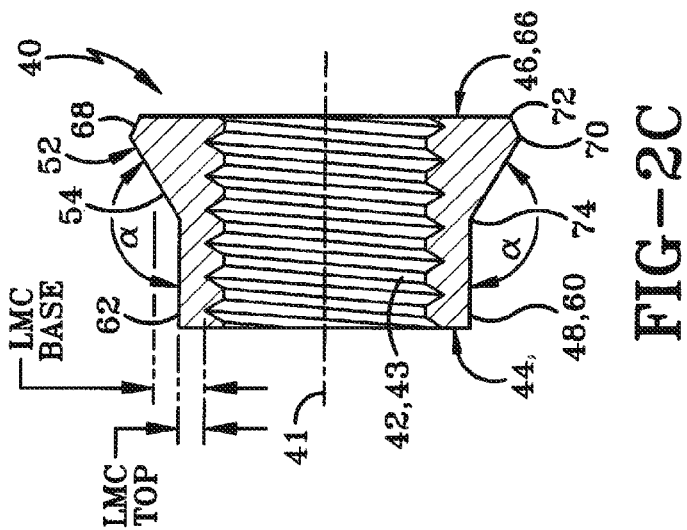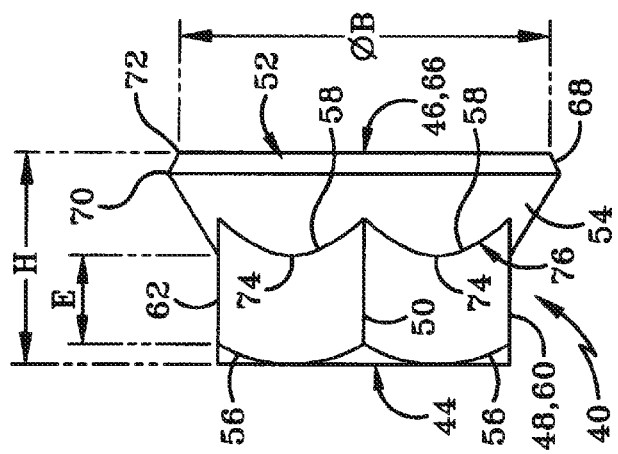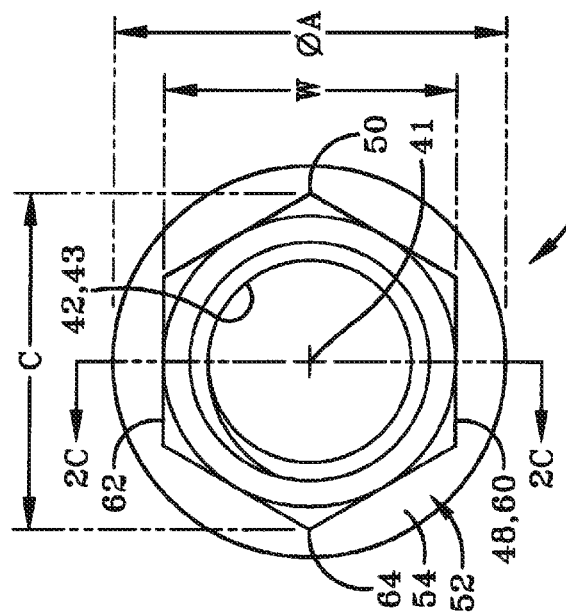

| PART NUMBER | THREAD /3/ CUT AS 8879 | LMC TOP (80) | LMC BASE (82) | A MAX (84) | B MIN (86) | C MIN (88) | E MIN (90) | H (92) MAX | H (92) MIN | W (94) MAX | W (94) MIN | AXIAL TENSILE LBS/MIN | TORQUE IN/LBS MIN/MAX | WEIGHT LBS/EA |
|---|---|---|---|---|---|---|---|---|---|---|---|---|---|---|
| MS21042-02 | .0860-56 UNJC-3B | 0.014 | 0.022 | 0.167 | 0.137 | 0.138 | 0.045 | 0.100 | 0.080 | 0.127 | 0.122 | 670 | .2-2.5 | 0.0002 |
| MS21042-04 | .1120-40 UNJC-3B | 0.015 | 0.026 | 0.206 | 0.176 | 0.171 | 0.050 | 0.125 | 0.103 | 0.158 | 0.150 | 1,110 | .5-5.0 | 0.0005 |
| MS21042-06 | .1380-32 UNJC-3B | 0.020 | 0.032 | 0.244 | 0.214 | 0.207 | 0.055 | 0.141 | 0.115 | 0.190 | 0.181 | 1,670 | 1.0-10.0 | 0.0008 |
| MS21042-08 | .1640-32 UNJC-3B | 0.020 | 0.035 | 0.290 | 0.260 | 0.244 | 0.060 | 0.188 | 0.125 | 0.221 | 0.213 | 2,490 | 1.5-15.0 | 0.0015 |
| MS21042-3 | .1900-32 UNJF-3B | 0.024 | 0.043 | 0.330 | 0.290 | 0.277 | 0.065 | 0.188 | 0.154 | 0.252 | 0.243 | 3,470 | 2.0-18.0 | 0.0018 |
| MS21042-4 | .2500-28 UNJF-3B | 0.024 | 0.050 | 0.420 | 0.386 | 0.347 | 0.090 | 0.219 | 0.204 | 0.316 | 0.304 | 6,200 | 3.5-30.0 | 0.0035 |
| MS21042-5 | .3125-24 UNJF-3B | 0.023 | 0.057 | 0.520 | 0.482 | 0.419 | 0.120 | 0.266 | 0.251 | 0.378 | 0.367 | 9,820 | 6.5-60.0 | 0.0060 |
| MS21042-6 | .3750-24 UNJF-3B | 0.024 | 0.066 | 0.620 | 0.575 | 0.491 | 0.125 | 0.282 | 0.267 | 0.440 | 0.430 | 15,200 | 9.5-80.0 | 0.0080 |
| MS21042-7 | .4375-20 UNJF-3B | 0.024 | 0.074 | 0.708 | 0.680 | 0.562 | 0.160 | 0.328 | 0.313 | 0.504 | 0.494 | 20,600 | 14.0-100 | 0.0130 |
| MS21042-8 | .5000-20 UNJF-3B | 0.024 | 0.085 | 0.814 | 0.786 | 0.633 | 0.225 | 0.410 | 0.350 | 0.566 | 0.556 | 27,500 | 18.0-150 | 0.0210 |
| MS21042-9 | .5625-18 UNJF-3B | 0.054 | 0.107 | 0.912 | 0.874 | 0.775 | 0.320 | 0.480 | 0.420 | 0.692 | 0.680 | 34,800 | 24.0-200 | 0.0360 |
| MS21042-10 | .6250-18 UNJF-3B | 0.055 | 0.118 | 1.014 | 0.976 | 0.846 | 0.365 | 0.550 | 0.490 | 0.755 | 0.743 | 43,600 | 32.0-300 | 0.0450 |

FIG-3

THIN WALLED FASTENER

BACKGROUND OF THE INVENTION

Technical Field

The present invention relates generally to the field of fasteners. More particularly, the present invention relates to threaded nuts. Specifically, the present invention relates to thin walled fastener nuts used in the aerospace and other related industries.

Background Information

Conventional lightweight hex-flange thin walled nuts are usually made from steel and have a very thin flat wall for receiving a wrench or socket. These conventional thin walled nuts include a wide range of available torque values and high tensile heat treat values.

Some thin walled nuts are susceptible to failure due to cracking. Cracking in a nut may occur when the nut is too brittle. One way in which the brittleness of metal increases is related to the high heat treatment the nuts go through to harden the nuts. This is sometimes referred to as hydrogen embrittlement.

In aerospace applications, some fasteners must meet the minimum requirements set forth in the National Aerospace Standard Specification MS21042 (NASM21042). However, note 3 contained in NASM21042 also states that self-locking nut fasteners must be used within the limitations provided in National Aerospace Standard MS33588 (NASM33588). Other fasteners must meet the minimum requirements set forth in the National Aerospace Standard Specification NAS1291 (NAS1291).

The limitations of NASM33588 state that self-locking nuts shall not be used at joints in control systems at single attachments, or where loss of the bolt would affect safety of flight unless the threaded parts are held by a positive locking device that requires shearing or rupture of materials before torsional loads would relieve the initial stress of the assembly. Further, self-locking nuts shall not be used on any externally threaded part that serves as an axis of rotation for another part unless there are no possible torsional loads which can be applied to either the externally or internally threaded part in such a manner as to relieve the initial stresses of the assembly, or unless the threaded parts are held by a positive locking device that requires shearing or rupture of the material before torsional loads would relieve the initial stresses of the assembly.

With continued reference to NASM33588, self-locking nuts shall not be used with bolts or screws on jet engine aircraft in locations where a loose nut, bolt, or screw could fall or be drawn into the engine air intake duct. Self-locking nuts shall not be used with bolts, screws, or studs to attach panels, doors or to assemble any parts that are routinely disassembled prior to or after each florid for access or servicing.

Some exemplary nuts satisfying NASM21042 and NAS1291 sometimes still fail due to cracking. Some other failures have been due to design, application and installation. The original purpose of the exemplary nuts was to reduce weight and they were never intended for critical applications. Due to the high mechanical properties in these exemplary nuts, many engineers have never read the limitations on pages 3 in NASM21042 for these exemplary thin walled nut fasteners.

Additionally, some nuts fail because of conflicting hardness values (HRC) permitted in a variety of specifications. When there are conflicting permitted HRC values, hydrogen embrittlement may result in failure. A variety of alerts and revisions from the European Aviation Safety Agency (EASA), the Department of Defense (DOD), and the Federal Aviation Administration (FAA) indicate NASM21042 and NAS1291 nut failures are due to hydrogen embrittlement caused from high hardness HRC values from heat treatment.

The specifications in NASM21042 and NAS1291 allow for a maximum hardness for nut fasteners of 49 HRC. However, one example of conflicting HRC value is depicted in the Aerospace Material Specification AMS-QQ-P-416. This specifications indicates that when plating cadmium via electrodeposited processes onto fasteners that parts heat treated to an ultimate tensile strength greater than 200 ksi (or 43 HRC), should not be plated. However, each NASM21042 and NAS1291 indicates that the maximum hardness can be 49 HRC. This conflict causes some fasteners to be heat plated at a hardness value greater than 43 HRC, such as 49 HRC as permitted by NASM21042 and NAS1291. This results in hydrogen embrittlement causing failure in the fastener when it cracks.

SUMMARY

Accordingly, most thin walled fasteners are used incorrectly, and issues continue to exist with cracking in fasteners. Thus, a need continues to exist to address these issues by creating a thin walled fastener nut stronger than what is presently known yet is still able to work within NASM21042 and NAS1291 print standards. The present invention addresses these and other issues.

In one aspect, the invention provides a reduction of the high HRC hardness requirements reducing the failures from hydrogen embrittlement. The current NASM21042 and NAS1291 indicate a 49 HRC maximum. The current MS21042L6 requires a 44 HRC to 45 HRC range to meet mechanical requirements. The present invention can meet the requirements below 43 HRC and typically the present invention has a hardness value in a range from 38 HRC to 39 HRC.

In one aspect, the invention may provide a thin walled nut fastener comprising: a threaded bore extending from a first end through the nut fastener to a second end and adapted to threadedly receive a complementary threaded bolt; a first flat wall adjacent the first end adapted to receive a wrench or socket for tightening to the bolt; a first wrenching corner at an edge of the first flat wall, the wrenching corner extending from an upper end adjacent the first end towards a lower end; and a tapered bell flange extending arcuately from adjacent the second end towards an apex contacting the flat wall above the lower end of the wrenching corner.

In another aspect, the invention may provide a tapered bell flange on a thin walled nut fastener, the tapered flange comprising: an angle greater than 90 degrees formed between a flat wall adjacent the tapered bell flange and an outer surface on the tapered bell flange; wherein tapered bell flange is adapted to reducing the likelihood of cracking as nut fastener is threaded onto a bolt.

In yet another aspect, an embodiment may provide a thin walled nut fastener comprising: a vertical flat wall including top and bottom ends; a horizontal wall extending from the bottom end to an outer edge; and a frustoconical wall extending from the outer edge to intermediate the top and bottom ends.

In another aspect, the invention may provide a thin walled fastener nut of the present invention includes a tapered bell flange extending from one end towards the other. The tapered bell flange provides structural support to the nut when used in aerospace application. The thin walled reduced height fastener nut with the tapered bell flange meets the minimum requirements of NASM21042 and NAS1291

BRIEF DESCRIPTION OF THE SEVERAL VIEWS OF THE DRAWINGS

A sample embodiment of the invention, illustrative of the best mode in which Applicant contemplates applying the principles, is set forth in the following description, is shown in the drawings and is particularly and distinctly pointed out and set forth in the appended claims. The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 2A is a top view of the present invention thin walled fastener nut;

FIG. 2B is a side view of the present invention;

FIG. 2C is a cross section view of the present invention taken along line 2C-2C in FIG. 2A;

FIG. 3 is a table depicting a plurality of part numbers of the present invention, each respective part number having the indicated dimensions.

Similar numbers refer to similar parts throughout the drawings.

DETAILED DESCRIPTION

Figure 1C:
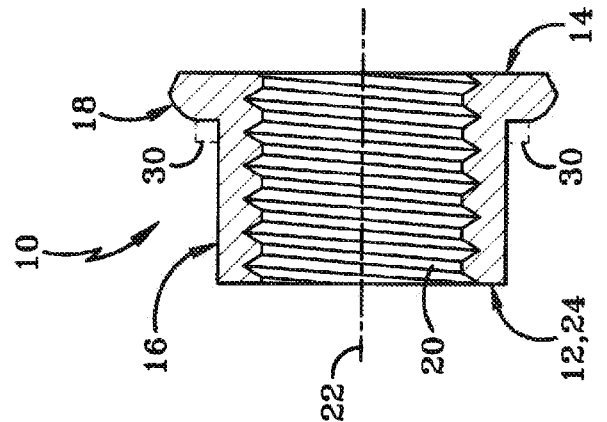
FIG. 1C is a cross section view taken along line 1C-1C in FIG. 1A.
Figure 1B:
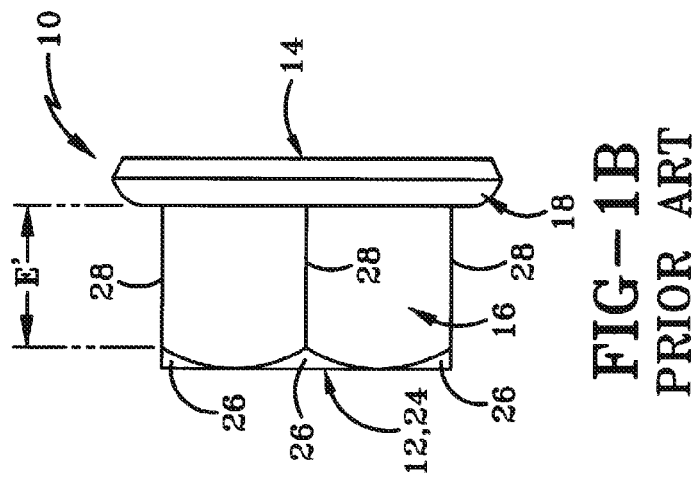
FIG. 1B is a side view of the PRIOR ART thin walled fastener nut.
Figure 1A:
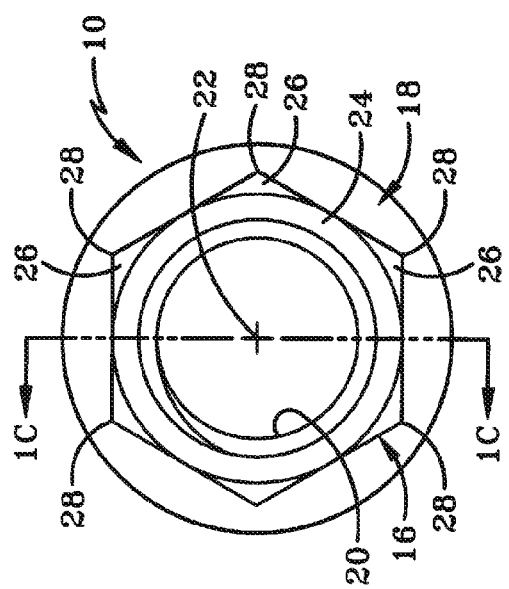
FIG. 1A is a top view of a PRIOR ART thin walled fastener nut.

A prior art and known thin walled fastener is depicted generally as 10 throughout FIG. 1A, FIG. 1B, and FIG. 1C. Prior art fastener 10 includes a first end 12 spaced apart from a second end 14, at least one flat wall 16 extending from the first end 12 towards the second end 14, a fixed washer 18 defining a second end 14, and a threaded bore 20 extending through the longitudinal center line 22 from first end 12 to second end 14. The first end 12 is defined by an upwardly facing annular top surface 24. Adjacent the outer edge of the annular top surface are six truncated sections 26 extending towards the second end 14 at symmetrical hexagon corners 28. Each corner 28 in the prior art device 10 is defined between two joined flat walls. These corners 28 are known as wrenching corners and extend from the first end 12 towards the second end 14. The bottom end of each wrenching corner 28 contacts the top surface 24 on the washer 18.

The first flat wall 16 includes two longitudinally extending and parallel, spaced apart edges defining a portion of each wrenching corner 28. An arcuately extending top edge extends from left to right between respective wrenching corners. A bottom edge of the first flat wall 16 contacts the fixed washer 18 in a generally perpendicular manner (perpendicular angle 30) and extends between the two wrenching corners. First flat wall 16 is substantially planar and has a height equal to dimension E' (FIG. 1B). Dimension E is measured from the bottom edge of first flat wall 16 where the bottom edge contacts the fixed washer 18 and extends upwardly towards first end 12 to where the bottom arcuate edge meets the upper end of the first wrenching corner 28 and the tip of the truncated hexagon section 26 at a point.

As depicted in FIG. 2A, a thin walled fastener nut of the present invention is shown generally as fastener nut 40. The fastener nut 40 of the present invention includes a threaded bore 42 extending through the centerline 41 from first end 44 to second end 46, a first flat wall 48 extending from first end 44 towards the second end 46, a wrenching corner 50 extending from adjacent first end 44 towards second end 46, a washer 52 defining the second end 46, and a tapered bell flange 54 extending from the washer 52 towards the first end 44 for structural support.

The threaded bore 42 defines threads 43 and extends completely through fastener nut from first end 44 to second end 46 along centerline 41. Bore 42 defines a bolt receiving aperture opening at each of the first end 44 and the second end 46. Threads 43 formed in the inner surface of the fastener body are shaped in a manner as one having ordinary skill in the art would understand.

The first flat wall 48 includes an arcuate top edge 56 spaced apart from an arcuate bottom edge 58. Two parallel longitudinally extending edges extend from arcuate top edge 56 to arcuate bottom edge 58 of first flat wall 48. First flat wall 48 outer surface 60 is substantially continuous and generally planar and configured to receive a wrench or socket via a frictional interference fit in order to create the torque needed to thread nut fastener 40 onto a bolt. A second flat wall 62 is spaced apart in a plane parallel to first flat wall 48. Second flat wall 62 also includes an arcuate top edge spaced apart from an arcuate bottom edge with two longitudinally extending parallel edges running therebetween. The distance across flat edges 48, 62, also known as an across flats distance, is indicated by dimension W in FIG. 2A. Dimension W, the across flats distance, varies depending on the overall size of the fastener nut 40. The preferred sizes of dimension W are indicated in the table of FIG. 3 in the column labeled by reference numeral 94.

The wrenching corner 50 is defined between two adjacent flat walls. Wrenching corner 50 extends from adjacent the first end 44 towards the tapered bell flange 54. The bottom of wrenching corner 50 contacts the tapered bell flange 54. The length of the wrenching corner 50 is identified as dimension E in FIG. 2B. The preferred sizes of dimension E are indicated in the table of FIG. 3 in the column labeled by reference numeral 90.

A second wrenching corner 64 is spaced apart and parallel to the first wrenching corner 50. Second wrenching corner 64 is sized dimensionally similar to that of the first wrenching corner 50 and the distance between wrenching corner or an across corners distance is indicated in FIG. 2A as dimension C. Dimension C varies depending on the overall size of the fastener nut. The preferred sizes of dimension C are indicated in the table of FIG. 3 in the column labeled by reference numeral 88.

Washer 52 defining second end 46 of nut fastener 40 includes a bottom surface 66 (when the nut fastener 40 is engaged with a bolt) and a slightly upwardly tapered annular side wall 68. An outer edge 70 of the washer 52 is identified as diameter dimension ØA in FIG. 2B. The inner edge 72 of washer 52 is identified by diameter dimension ØB in FIG. 2B. The preferred sizes of diameter dimension ØA and diameter dimension ØB are indicated in the table of FIG. 3 labeled by reference numeral 84 and 86, respectively.

The tapered bell flange 54 extends from the washer 52 upwardly towards the first end 44. Tapered bell flange 54 terminates at an upper apex 74. The upper apex 74 of a downwardly facing concave edge 76 is the lower most portion of dimension E. Apex 74 of tapered bell flange 54 contacts first flat wall 48. Downwardly concaving edge 76 of tapered bell flange 54 extends between two wrenching corners 50 on each respective side of the first flat wall 48. Apex 74 is located closer to the first end 44 than the lower end of the wrenching corner 50. Edge 76 is a generally inverted U-shaped edge extending across and continuously contacting the flat wall 48.

Bell flange 54 includes a generally triangular profile when viewed in cross section. Stated otherwise, tapered bell flange 54 is frustoconical, defining a frustoconical wall having an arcuate outer surface, when viewed in cross section. Tapered bell flange 54 contacts first flat wall 48 creating an external first angle α therebetween. The angle α is measured from the outer surface 60 of first flat wall 48 to the outer surface of the tapered bell flange 54. Unlike the prior art, which has a 90 degree angle (reference numeral 30 in FIG. 1C) between the flat wall 16 (FIG. 1C) and the washer 18 (FIG. 1C), the present invention 40 includes an angle α between the first flat wall 48 and the tapered bell flange 54 greater than 90 degrees.

With continued reference to FIG. 2C, the thin walled fastener nut of the present invention includes a Least Material Condition (LMC) top thickness measured from the outer surface 60 of the first flat wall 48 to the outer most portion of the threads 43 as identified in FIG. 2C as dimension LMC TOP. An average bell flange thickness is measured from the middle of the bell flange to the outer most portion of the threads 43, as is identified in FIG. 2C as dimension LMC BASE.

A bell flange surface dimension in cross section is defined between outer edge 70 and upper apex 74 in FIG. 2C. The range of bell flange surface dimensions will be discussed below.

As depicted in FIG. 3, a table describes the dimensions of thin walled nut fastener 40 depending on a part number. The dimensions identified in FIG. 3 satisfy the requirements of the NASM21042 for the thin walled fastener nuts. The table includes dimensions LMC TOP 80, LMC BASE 82, diameter dimension ØA 84, diameter dimension ØB 86, dimension C 88, dimension E 90, dimension H 92, dimension W 94, the axial tensile strength (LBS/MIN), the torque (MIN/MAX), and the weight of nut fastener 40. Dimension LMC TOP 80 varies in a range from 0.014 inches to 0.055 inches depending on the part number. By way of a non-limiting example, a part number MS21042-02 with a thread cut as 8879, 0.0860-56UNJC-3B has an LMC TOP 80 dimension of 0.014 inches. Dimension LMC BASE 82 is in a range from about 0.022 inches to 0.118 inches. With continued reference to part number MS21042-02 the LMC base dimension is 0.022 inches.

Diameter dimension ØA 84 is in a range from 0.167 inches to 1.014 inches. As shown by way of a non-limiting example with part number MS21042-02, diameter dimension A 84 is 0.167 inches. Diameter dimension ØB 86 is in a range from 0.137 inches to 0.976 inches, and in part number MS21042-02 diameter dimension ØB 86 is 0.137 inches.

Dimension C 88 is in a range from 0.138 inches to 0.846 inches. In part number MS21042-02 dimension C 88 is 0138 inches. Dimension E 90 is in a range from 0.045 inches to 0.365 inches and with respect to part number MS21042-02, dimension E 90 is 0.045 inches.

Dimension H 92 provides an acceptable range value for each part to be within. The overall range of any part, with respect to dimension H 92, is in a range from about 0.08 inches to 0.55 inches. However, with respect to part number MS21042-02, dimension H 92 may be in a range from a minimum of 0.08 inches to a maximum of 0.1 inches. Looking further to another part, MS21042-04, dimension H 92 may be in a range of a minimum of 0.103 inches to a maximum of 0.125 inches. These minimum and maximum ranges for each respective part vary dependent on the part and are identified fully in the table contained in FIG. 3.

Dimension W 94 includes a minimum and maximum range value for each part. The overall minimum and maximum range of dimension W 94 is in a range from 0.122 inches to 0.755 inches. With respect to part number MS21042-02 the dimension W 94 is in a range from a minimum of 0.122 inches to a maximum of 0.127 inches. With respect to part number MS21042-04, dimension W 94 is in a range from a minimum of 0.15 inches to a maximum 0.158 inches. The remainder of these minimum and maximum ranges for each respective part is contained, in their entirety, in the table identified in FIG. 3.

The range in which bell flange surface dimension extending between edge 70 and apex 74 varying depending on the minimum and maximum range value of Dimension W 94 and the minimum and maximum range value of Dimension H 92. The bell flange surface dimension may be calculated via the quadratic equation. The bell flange surface dimension for all parts identified in FIG. 3 is in a range from 0.04 inches to about 0.25 inches. With respect to part number MS21042-02, the bell flange surface dimension in cross section is in a range from a minimum of 0.04 inches to a maximum of 0.06 inches. With respect to part number MS21042-04, the bell flange surface dimension in cross section is in a range from a minimum of 0.59 inches to a maximum of 0.08 inches. The remainder of bell flange dimension minimum and maximum ranges for each respective part may be calculated via the quadratic equation from the values identified in FIG. 3.

The axial tensile strength is identified in a column in FIG. 3 having a unit of LBS/MIN. For a respective part number identified in the table of FIG. 3, the axial tensile strength is in a range of 670 to 43,600 LBS/MIN. Further identified in the table in FIG. 3 is the torque having a unit of inch pounds and is in a minimum/maximum range for each specific part number. The torque(s) range from 0.2 to 300 inch pounds. For a specific part, the torque variances are much smaller. For example, with respective part number MS21042-02, the torque is in a range of a minimum of 0.2 to 2.5 inch pounds. With respect to part number MS21042-04, the torque is in a range of a minimum of 0.5 to 5.0 inch pounds. FIG. 3 further identifies the weight, in pounds of each nut fastener 40. The weight of each individual nut fastener 40 varies depending on the size of each individual part and it is depicted that weight is in a range from 0.002 to 0.0450 pounds.

Figure 4:
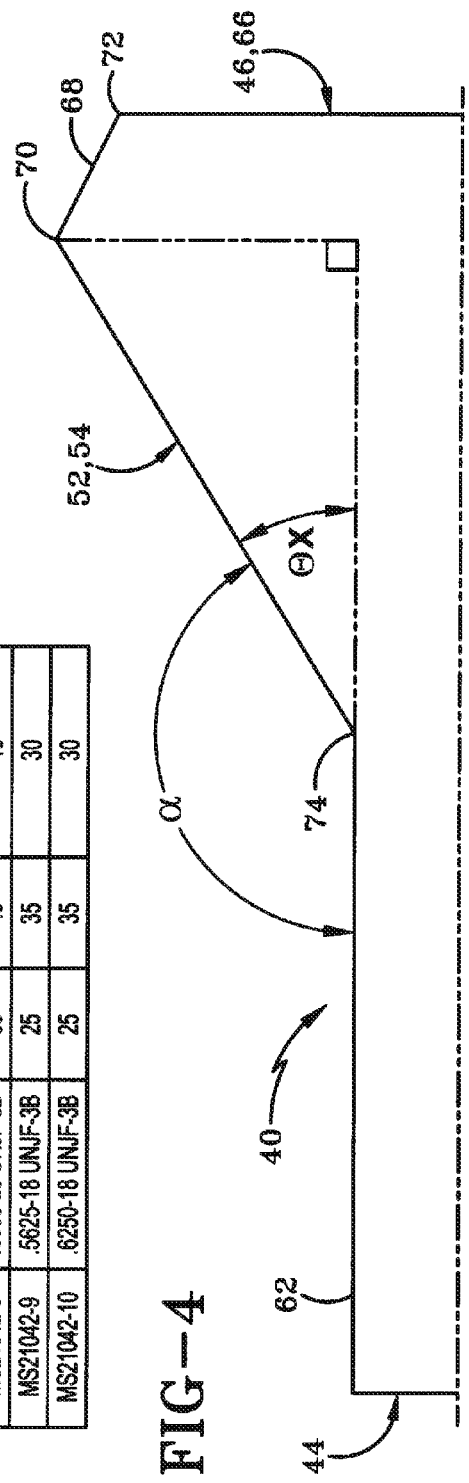
FIG. 4 is an enlarged schematic representation of an internal angle supplementary to an external angle on the thin walled fastener and a corresponding table depicting a plurality of part numbers of the present invention, each respective part number having a range of degrees the internal angle is within, as well as a preferred internal angle for each part number.

With reference to FIG. 4, an internal second angle θX is supplementary and adjacent to angle α internally in thin wall nut fastener 10. The internal second angle θX is in a range from about 20 degrees to about 50 degrees. In one particular embodiment, the internal second angle θX is in a range from 20 degrees to 25 degrees. In another particular embodiment, the internal second angle θX is in a range from 25 degrees to 30 degrees. In yet another particular embodiment, the internal second angle θX is in a range from 30 degrees to 35 degrees. Another embodiment provides the internal second angle θX in a range from about 35 degrees to about 40 degrees. In another particular embodiment, the internal second angle θX is in a range from 40 degrees to 45 degrees. In another embodiment, the internal second angle θX is in a range from 45 degrees to 50 degrees.

With continued reference to FIG. 4, for a thin walled nut 10 with tapered bell flange 54 and a thread cut identified as 0.0860-56, the internal second angle θX is in a range from about 20 degrees to about 30 degrees, and is preferably 25 degrees. For a thin walled nut 10 with tapered bell flange 54 and a thread cut identified as 0.1120-40, the internal second angle θX is in a range from about 23 degrees to about 33 degrees, and is preferably 28 degrees. For a thin walled nut 10 with tapered bell flange 54 and a thread cut identified as 0.1380-32, the internal second angle θX is in a range from about 23 degrees to about 33 degrees, and is preferably 28 degrees. For a thin walled nut 10 with tapered bell flange 54 and a thread cut identified as 0.1640-32, the internal second angle θX is in a range from about 23 degrees to about 33 degrees, and is preferably 28 degrees. For a thin walled nut 10 with tapered bell flange 54 and a thread cut identified as 0.1900-32, the internal second angle θX is in a range from about 25 degrees to about 35 degrees, and is preferably 30 degrees. For a thin walled nut 10 with tapered bell flange 54 and a thread cut identified as 0.2500-28, the internal second angle θX is in a range from about 26 degrees to about 36 degrees, and is preferably 31 degrees. For a thin walled nut 10 with tapered bell flange 54 and a thread cut identified as 0.3125-24, the internal second angle θX is in a range from about 27 degrees to about 37 degrees, and is preferably 32 degrees. For a thin walled nut 10 with tapered bell flange 54 and a thread cut identified as 0.3750-24, the internal second angle θX is in a range from about 35 degrees to about 45 degrees, and is preferably 40 degrees. For a thin walled nut 10 with tapered bell flange 54 and a thread cut identified as 0.4375-20, the internal second angle θX is in a range from about 35 degrees to about 45 degrees, and is preferably 40 degrees. For a thin walled nut 10 with tapered bell flange 54 and a thread cut identified as 0.500-20, the internal second angle θX is in a range from about 35 degrees to about 45 degrees, and is preferably 40 degrees. For a thin walled nut 10 with tapered bell flange 54 and a thread cut identified as 0.5625-18, the internal second angle θX is in a range from about 25 degrees to about 35 degrees, and is preferably 30 degrees. For a thin walled nut 10 with tapered bell flange 54 and a thread cut identified as 0.6250-18, the internal second angle θX is in a range from about 25 degrees to about 35 degrees, and is preferably 30 degrees.

In accordance with an aspect of the present invention, the bell flange 54 design increases the axial strength of the hex flange nut 40 by increasing the least material condition (LMC) near the base where the stress load starts during assembly. The weight of nut 40 is approximately the same on a scale that falls within the maximum weight requirements set forth by the National Aerospace Standard. The nut 40 falls within the dimensional tolerances and specifications of NASM21042 and has a bell flange 54 bottom to reduce misuse of applications.

Nut 40 meets all the requirements of NASM21042 and NAS1291, which is on most aircraft built in the world market. The fastener nut 40 should reduce the possibilities of overload during installation and lessen single point overload thereby reducing cracking or post ductile type failures (SPO).

Another advantage of nut 40 is the ability to reduce the higher Rockwell Scale (HRC) hardness values to meet the minimum mechanical values and to reduce the comments necessary for typical hydrogen embrittlement. On a typical MS21042-6 nut, the HRC value is required to meet the minimum axial strength requirement of 15,200 lbs. However, nut 40 reduces several HRC points from the maximum 43 HRC indicated in the Aerospace Material Specification AMS-QQ-P-416 Revision C, the entirety of which is hereby incorporated by reference as if fully rewritten herein. Nut 40 is preferably lower than 43 HRC and typically in a range from 34 HRC to 36 HRC.

In operation, the nut 40 is used by contacting one of a wrench and socket adjacent an apex 74 along a tapered bell flange 54 on a thin walled fastener 40, wherein the tapered bell flange 54 is adapted to reduce cracking in a thin walled nut fastener; and rotating the bell flange 54 about an axis to tighten the thin walled nut fastener 40 onto a bolt. Further, for disclosure purposes, the entirety of NASM21042 and NAS1291 and NASM33588 are hereby incorporated by reference herein as if fully rewritten.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the invention are an example and the invention is not limited to the exact details shown or described.

What is claimed:

1. A thin walled nut fastener, comprising:
    a bore extending from a first end through the nut fastener to a second end and adapted to threadedly receive a complementary threaded bolt, wherein the bore is threaded completely through the nut fastener from the first end to the second end;
    a first flat wall adjacent the first end adapted to receive a wrench or socket for tightening to the bolt;
    a first wrenching corner at an edge of the first flat wall, the wrenching corner extending from adjacent the first end towards the second end; and
    a tapered bell flange extending from adjacent the second end towards an apex contacting the flat wall;
    an external first angle measured between an outer surface on the first flat wall and an outer surface on the tapered bell flange, the external first angle greater than 90 degrees, wherein the outer surface on the tapered bell flange has a first end in direct contact with the first flat wall outer surface; and
    an internal second angle supplementary and adjacent to the first angle, wherein the internal second angle is in a range from about 20 degrees to about 50 degrees, wherein a second end of the tapered bell flange forms an outermost edge of the nut fastener, wherein the second end of the nut fastener has a diameter that is smaller than a diameter of the second end of the tapered bell flange, wherein an inwardly tapered annular sidewall is connected to the second end of the tapered bell flange, and wherein the inwardly tapered annular sidewall extends between the tapered bell flange and the second end of the nut fastener.

2. The nut fastener of claim 1, wherein the internal second angle is in a range from 20 degrees to 25 degrees.

3. The nut fastener of claim 1, wherein the internal second angle is in a range from 25 degrees to 30 degrees.

4. The nut fastener of claim 1, wherein the internal second angle is in a range from 30 degrees to 35 degrees.

5. The nut fastener of claim 1, wherein the internal second angle is in a range from about 35 to about 40.

6. The nut fastener of claim 1, wherein the internal second angle is in a range from 40 degrees to 45 degrees.

7. The nut fastener of claim 1, wherein the internal second angle is in a range from 45 degrees to 50 degrees.

8. The nut fastener of claim 1, further comprising:
an arcuate edge on the tapered bell flange continuously contacting the first flat wall extending from the first wrenching corner to a second wrenching corner; and
wherein an apex is positioned along the arcuate edge at a point closest to the first end.

9. The nut fastener of claim 1, further comprising a generally triangular profile of the tapered bell flange.

10. The nut fastener of claim 1, further comprising: an arcuate edge end on the tapered bell flange joined with the lower end of the wrenching corner and above the second end when viewed from the side.

11. The nut fastener of claim 1, further comprising a fixed washer defining the second end.

12. The nut fastener of claim 1, further comprising:
a second flat wall spaced apart in a plane parallel to that of the first flat wall; and
an across flats distance measured between first and second flat walls;
wherein the across flats distance in the range of 0.1 to 0.5 inches.

13. The nut fastener of claim 1, further comprising:
a second flat wall joined to the first flat wall, wherein the first wrenching corner is formed at the union of the first flat wall and the second flat wall;
a second wrenching corner spaced apart extending parallel to the first wrenching corner formed at the union of a third and fourth flat wall; and
an across corners distance measured from first to second wrenching corner, wherein the across corners distances is in a range from 0.1 to 0.5 inches.

14. The nut fastener of claim 1, further comprising:
an arcuate edge formed at a union of an upper end on the tapered bell flange and the first flat wall;
a wrenching corner length measured from an apex on the arcuate edge to the first end, the corner length in a range from 0.03 to 0.4 inches.

15. The nut fastener of claim 1, further comprising:
a washer defining the second end, the washer diameter is in a range from about 0.15 to about 1.1 inches.

16. The nut fastener of claim 1, further comprising a height measured from first end to second end in a range from about 0.07 to about 0.6 inches.

17. The nut fastener of claim 1, further comprising:
a LMC TOP distance measured from the threaded bore to the outer surface on the first flat wall adjacent the first end, wherein the LMC TOP distance is in a range from about 0.01 to about 0.06 inches.

18. The nut fastener of claim 1, further comprising:
a LMC BASE distance measured from the threaded bore to the a midpoint on the tapered bell flange adjacent the second end, wherein the LMC BASE distance is in a range from about 0.02 to about 0.125 inches.

19. The nut fastener of claim 1, including an axial tensile strength in a range from about 600 lbs/min to about 45,000 lbs/min.

20. The nut fastener of claim 1, including a hardness value less than about 43 HRC.

21. The nut fastener of claim 1, including a hardness value in range from about 34 HRC to about 36 HRC.

22. A thin walled nut fastener, comprising:
a bore extending from a first end through the nut fastener to a second end and adapted to threadedly receive a complementary threaded bolt, wherein the bore is threaded completely through the nut fastener from the first end to the second end;
a hardness value less than about 43 HRC;
a tapered bell flange;
an external first angle greater than 90 degrees formed between a flat wall adjacent the tapered bell flange and an outer surface on the tapered bell flange, wherein an outer surface on the tapered bell flange has a first end in direct contact with an outer surface of the flat wall; and
an internal second angle supplementary and adjacent to the first angle;
wherein tapered bell flange is adapted to reduce the likelihood of fastener failure due to cracking, wherein the internal second angle is in a range from about 20 degrees to about 50 degrees, wherein a second end of the tapered bell flange forms an outermost edge of the nut fastener, and wherein the second end of the nut fastener has a diameter that is smaller than a diameter of the second end of the tapered bell flange, wherein an inwardly tapered annular sidewall is connected to the second end of the tapered bell flange, and wherein the inwardly tapered annular sidewall extends between the tapered bell flange and the second end of the nut fastener.

23. The thin walled nut fastener of claim 22, further comprising:
a convex outer surface on the tapered bell flange extending arcuately between a first wrenching corner at one edge on the flat wall and a second wrenching corner spaced apart at an opposite edge on the flat wall.

24. The thin walled nut fastener of claim 22, further comprising a generally inverted U-shaped edge extending across and continuously contacting the flat wall.

* * * * *